UNITED STATES PATENT OFFICE 2,365,561

PREPARATION OF MERCAPTANS

Morris Selig Kharasch, Chicago, Ill., assignor to E. I. du Pont de Nemours & Company, Wilmington, Del., a corporation of Delaware No Drawing. Application January 29, 1942, Serial No. 428,673

18 Claims. (Cl. 260—609)

This invention relates to the preparation of mercaptans by a new process.

An object of the invention is to prepare organic mercaptans, some of which are new, by a new process many of whose products of reaction are new.

The objects of the invention are accomplished, generally speaking, by subjecting the organic intermediate to reaction with chlorine and carbon disulfide in the presence of actinc light, and in the preferred form of the invention in the presence of a catalyst.

The preferred intermediates, according to my process, are saturated aliphatic, alicylic and araliphatic compounds. By saturated it is not necessarily implied that the entire compound shall be free from double bonds, but that there must be a saturated chain in a compound of this type. Nevertheless, in the preferred form of the invention double bonds are generally avoided. Hydrocarbons such as "Decalin," "Tetralin," white oils, long chain alkanes such as cetane or octadecane, naphthenes, long chain alkyl aromatics such as dodecyl benzene, amyl or poly amyl naphthalene, paraffin wax, and scale wax are exemplary.

Other halogens can be used in place of chlorine, but the volatility of chlorine and its characteristics of reaction make it the preferred reactant. It may be bubbled through the solution at any selected rate, but it is to be noted that the rate at which it is admitted has an effect upon the temperature of the reaction and upon the yield.

The process proceeds under the influence of actinic light. This may be furnished by daylight or by a source such as an electric bulb, mercury vapor lamp, carbon arc, a fluorescent light, or a neon light. These examples are illustrative because any type of actinic light may be employed.

Pyridine is a catalyst for the reaction. In general the characteristics of the catalyst are that it shall promote the formation of free radicals or of atoms, such as of the chlorine atom. Any catalyst of this type may be used.

The reaction may be carried out in the presence or in the absence of solvents. The solvents selected should be inert. Carbon tetrachloride and chloroform are examples of solvents which are not harmful.

The temperature at which the reaction is carried out may vary greatly, but is naturally limited by the boiling ranges of the reactant mixtures. Reactions may be carried out at atmospheric pressure or at reduced or increased pressure. The mass may be stirred if it is desirable.

Hydrochloric acid gas is generated and, in escaping from the mixture, tends to carry off carbon disulfide. This may be recovered by collection in condensers cold enough to freeze out the carbon disulfide.

The following is a general description of the process: Equivalent amounts (1 part) of the saturated compound and carbon disulfide were mixed together. Dry chlorine gas was admitted through a distributor extending nearly to the bottom of the reaction vessel. One two hundred-fiftieth part of dry pyridine was added to the reaction mixture. A beam of actinic light was furnished by a Mazda lamp. The reaction was kept below 40° C. by external cooling. The temperature of the reaction could also be controlled to a certain extent by changing the rate of flow of the chlorine. When the pyridine was added the solution became cloudy and all of the chlorine being passed in was absorbed. After a short time the solution became clear again and much of the gas passed on through. Further additions of catalyst (pyridine) produced a repetition of this phenomenon. The reaction was continued for approximately six hours and then the volatile products were removed by heating to 75° C. at a pressure of 2–3 mm. The remaining oil was hydrolyzed by refluxing for three hours with excess potassium hydroxide in alcohol. After removing the alcohol in vacuo the residue was acidified and extracted with ether. The ether solution was dried over anhydrous sodium sulfate. Distillation of the ether left a mixture of aliphatic mercaptans, unreacted starting material and other products of the reaction which may or may not contain chlorine. This residue could be used as such or could be purified by distillation.

The following examples are exemplary not limitative, and the parts therein are by weight unless otherwise stated.

*Example I*

One part of carbon disulfide and one part of cyclohexane and one two hundred-fiftieth part of pyridine was illuminated by a 1000-watt Mazda lamp and at the same time chlorine was passed slowly into the solution. An effort was made to keep the temperature below 40° C., and it was found necessary to use about five hours for the introduction of 0.42 part of chlorine. The volatile products of the reaction were then removed at reduced pressure, during which the temperature of the mixture was not allowed to rise above 80° C. The residue was a clear light yellow non-distillable oil, (Cl 39–43%; S 24–25%). This oil was hydrolyzed by refluxing with 2.5 times the amount of alcoholic potassium hydroxide theoretically necessary to convert the intermediate to the mercaptan. The oil was added slowly to the hot solution of alcoholic KOH. The alcohol was removed in vacuo and water added to the residue. Upon acidification a dark oil separated and was extracted with ether. The ether solution was dried and distilled. A fraction was obtained boiling at 157–162° C. and identified as cyclohexyl mercaptan, sulfur 27.16%; theory sulfur 27.60%.

*Example II*

Pure cyclohexane (one part) and carbon disulfide (one part) and pyridine (0.06 part) was illuminated by a 1000-watt Mazda lamp. A slow stream of chlorine was passed into the solution for 26 hours. The reaction mixture was then heated to 75° C. in vacuo to remove any volatile material present. The residue was a bright yellow oil that turned red on standing (Cl 39%; S 16.85%). The oil was hydrolyzed by alcoholic potassium hydroxide and worked up in a manner similar to that described in Example I. The oil obtained on distillation of the ether contained 17.71% sulfur of which 10.68% was present as mercaptan sulfur.

A theory of the reaction is set forth in the Journal of the American Chemical Society, 63, 625. However, the applicant does not choose to be bound by theory regardless of its seeming validity.

The products which are produced by this novel process may be used in the preparation of rubber accelerators, flotation agents, dye intermediates, pharmaceuticals, surface active agents and in gasoline. These uses are merely suggestive and exemplary, it being understood that the applicant is entitled to protection on all uses where the compositions produced are new.

As many apparently widely different embodiments of this invention may be made without departing from the spirit and scope thereof, it is to be understood that I do not limit myself to the specific embodiments thereof except as defined in the appended claims.

I claim:

1. The process which comprises passing chlorine slowly into a solution of carbon disulfide and cyclohexane in equimolecular parts in the presence of pyridine and under the influence of actinic light, the chlorine being passed in at a rate designed to keep the temperature below about 40° C., removing volatile reaction products at reduced pressure and at temperatures below about 80° C. hydrolyzing the residue by refluxing with about two and one-half times the amount of alcoholic potassium hydroxide theoretically necessary to convert the intermediate to the mercaptan, the residue being added thereto little by little, removing alcohol in vacuo, adding water, acidifying and extracting with ether, drying the ether extract, and removing cyclohexyl mercaptan therefrom.

2. The process which comprises passing chlorine slowly into a solution of carbon disulfide and cyclohexane in the presence of pyridine and under the influence of actinic light, the temperature being kept below about 40° C., removing reaction products of relatively high volatility, converting the residue by refluxing it with alcoholic potassium hydroxide, distilling the residue in vacuo, adding water thereto, acidifying and extracting it with ether, drying the ether extract, and removing cyclohexyl mercaptan therefrom.

3. The process which comprises passing chlorine into a solution of carbon disulfide and cyclohexane in the presence of pyridine under the influence of actinic light, and with controlled temperature below 40° C., removing volatile reaction products, refluxing the residue with alcoholic alkali hydroxide, removing volatiles from the residue, adding water thereto, acidifying it and removing cyclohexyl mercaptan therefrom.

4. The process which comprises mixing chlorine, carbon disulfide, and cyclohexane in the presence of pyridine and under the influence of actinic light, while maintaining the temperature below 40° C., mixing the reaction product with alcoholic alkali hydroxide, and isolating cyclohexyl mercaptan.

5. The process of preparing cyclohexyl mercaptan which comprises reacting chlorine, carbon disulfide and cyclohexane under the influence of actinic light in the presence of pyridine.

6. The process which comprises reacting chlorine, carbon disulfide and a saturated alicyclic hydrocarbon under the influence of actinic light and in the presence of pyridine and hydrolyzing the product to a mercaptan.

7. The process which comprises reacting chlorine, carbon disulfide and a saturated alicyclic hydrocarbon in the presence of pyridine and under the influence of actinic light.

8. The process which comprises reacting chlorine, carbon disulfide and a saturated aliphatic hydrocarbon under the influence of actinic light and in the presence of pyridine and hydrolyzing the product to a mercaptan.

9. The process which comprises reacting chlorine, carbon disulfide and a saturated aliphatic hydrocarbon in the presence of pyridine and under the influence of actinic light.

10. A derivative of cyclohexane containing about 39% to about 43% chlorine and about 24% to about 25% sulfur and which is obtained by reacting cyclohexane with chlorine and carbon disulfide in the presence of pyridine and under the influence of actinic light at temperatures below 40° C.

11. An aliphatic compound containing sulfur and chlorine and which is obtained by reacting chlorine and carbon disulfide with a saturated aliphatic hydrocarbon in the presence of pyridine and under the influence of actinic light.

12. An alicyclic compound containing sulfur and chlorine and which is obtained by reacting chlorine and carbon disulfide with a saturated alicyclic hydrocarbon in the presence of pyridine and under the influence of actinic light.

13. The process which comprises reacting chlorine carbon disulfide and an aryl substituted saturated aliphatic hydrocarbon under the influence of actinic light and in the presence of pyridine and hydrolyzing the product to a mercaptan.

14. The process which comprises reacting chlorine, carbon disulfide and an aryl substituted saturated aliphatic hydrocarbon in the presence of pyridine and under the influence of actinic light.

15. The process which comprises reacting chlorine, carbon disulfide and a compound from the group consisting of saturated acyclic, saturated alicyclic, and aryl substituted saturated aliphatic hydrocarbons in the presence of actinic light and pyridine.

16. The process which comprises reacting a halogen, carbon disulfide, and a compound from the group consisting of saturated acyclic, saturated alicyclic and aryl substituted saturated aliphatic hydrocarbons under the influence of actinic light and in the presence of pyridine.

17. An organic compound containing sulfur and chlorine and which is obtained by reacting chlorine and carbon disulfide with a compound from the group consisting of saturated acyclic, saturated alicyclic and aryl substituted saturated aliphatic hydrocarbons in the presence of pyridine and under the influence of actinic light.

18. An araliphatic compound containing sulfur and chlorine and which is obtained by reacting chlorine and carbon disulfide with an aryl substituted saturated aliphatic hydrocarbon in the presence of pyridine and under the influence of actinic light.

MORRIS SELIG KHARASCH.